March 27, 1956
J. H. BAKER ET AL
2,739,441
TEMPERATURE RESPONSIVE CONTROL SYSTEM FOR GAS
TURBINE POWER PLANT HAVING EXHAUST REHEATING
Filed Nov. 23, 1949
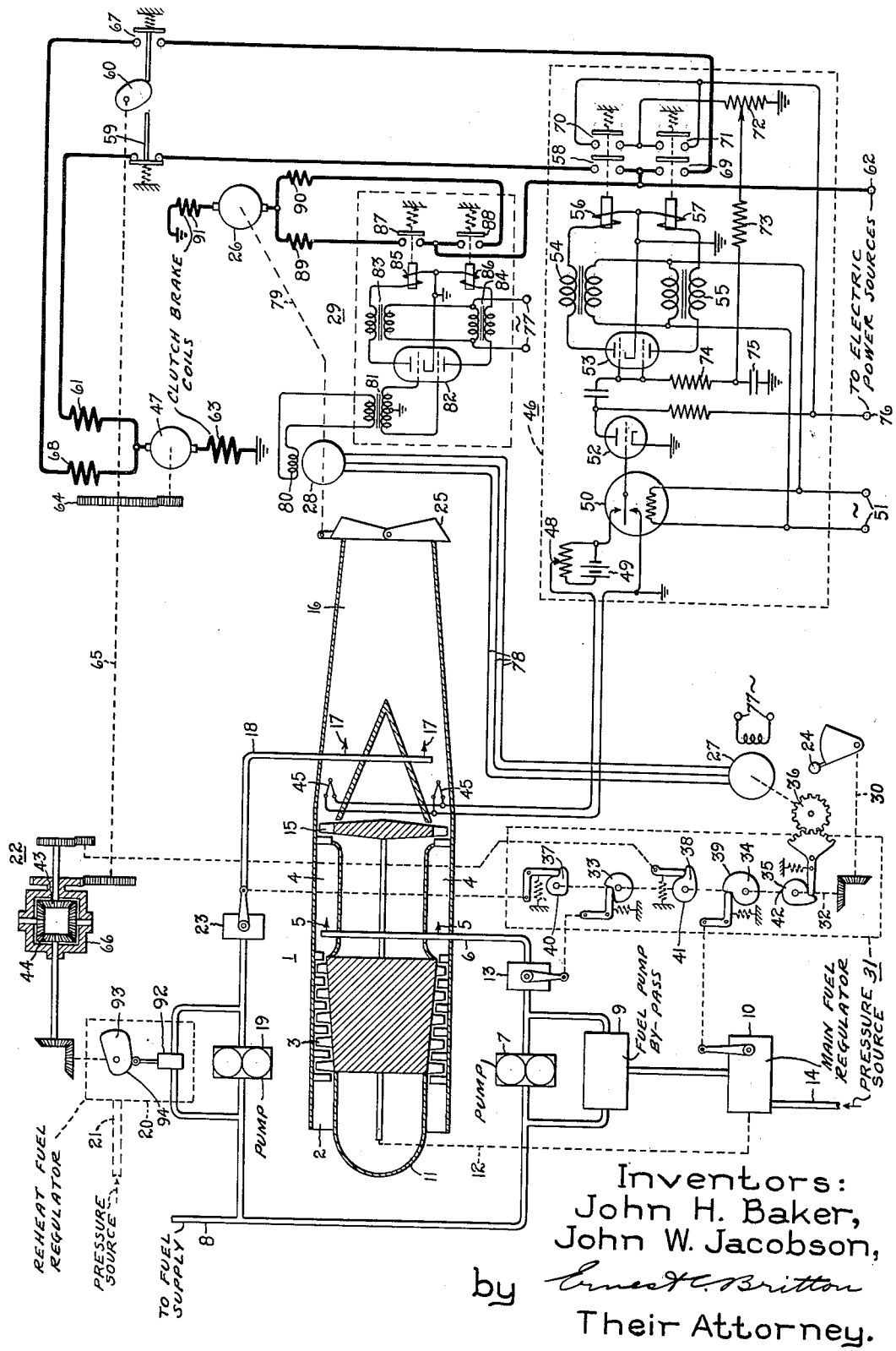
Inventors:
John H. Baker,
John W. Jacobson,
by Ernest H. Britton
Their Attorney.

United States Patent Office 2,739,441
Patented Mar. 27, 1956

2,739,441

TEMPERATURE RESPONSIVE CONTROL SYSTEM FOR GAS TURBINE POWER PLANT HAVING EXHAUST REHEATING

John H. Baker, San Diego, Calif., and John W. Jacobson, Schenectady, N. Y., assignors to General Electric Company, a corporation of New York Application November 23, 1949, Serial No. 129,074

15 Claims. (Cl. 60—35.6)

This invention relates to control systems for gas turbine power plants and more particularly to a control system for providing a predetermined relationship between throttle position and thrust in an aircraft gas turbine power plant having exhaust reheating for augmentation of thrust.

A gas turbine power plant for the propulsion of aircraft may include an air compressor for initially increasing the pressure of the incoming air, combustion apparatus for burning fuel in the compressed air, and a gas turbine arranged in series flow relation with the compression and combustion apparatus through which the hot, high pressure gas generated by the compressor and combustion apparatus is expanded. The turbine extracts at least sufficient power from these gases to drive the compressor and the power remaining may be used to produce thrust for propelling the aircraft by discharging the gases exhausted from the turbine rearwardly through a suitable nozzle. Aircraft gas turbine power plants of this type are more particularly described in Patent 2,432,359 to Dale D. Streid, and an application Serial No. 541,565, filed June 22, 1944, of Alan Howard, now Patent No. 2,711,074, issued June 21, 1955, both assigned to the assignee of the present application.

In the design of gas turbine power plants, particularly for high performance aircraft, it may be desirable to provide means for augmenting the thrust during short periods of time and various methods for producing this augmentation of thrust have been utilized including exhaust reheating.

In the exhaust reheating cycle, additional fuel is injected downstream from the turbine and burned in the tail pipe. The thrust available for propelling the aircraft is a function of the velocity of the hot gases flowing through the nozzle at the rear of the power plant and, thus, the thrust may be augmented by increasing the velocity of the flow of the hot gases through the nozzle. This increase in velocity is effected by the tail pipe fuel burning which increases the temperature of the hot gases after they are discharged from the turbine and prior to the final discharge from the propelling nozzle. This tail pipe burning may yield a nozzle discharge gas temperature which can approach 3,000° F. The resulting high velocity of the gas discharged through the jet nozzle can produce a new thrust increase or augmentation of up to 45% at take off and 90% in high speed flight.

The tail pipe fuel burning does not directly affect the temperature of the gas discharged at the turbine since the burning takes place some distance downstream. However, assuming a fixed area jet nozzle, the increase in discharge gas temperature in the tail pipe by virtue of the tail pipe fuel burning is accompanied by an increase in the static pressure of the gas in the tail pipe proportional to the temperature increase. This increase in discharge gas pressure results in a decrease in the pressure drop across the turbine which tends to decrease the turbine speed. Since most aircraft gas turbines of the type here considered are provided with governors, the decrease in turbine speed will cause the governor to increase the fuel flow to the combustion apparatus so as to return the turbine speed to the desired value. The increase in fuel flow to the main combustion apparatus produces a proportionate increase in the temperature of the gas passing through the turbine so that a turbine discharge gas temperature of 2,000° F. or higher may result by virtue of the tail pipe reheat fuel burning when a fixed area jet nozzle is utilized. This high gas temperature at the turbine may be detrimental to the turbine structure and it is, therefore, desirable to provide means for insuring that the turbine discharge gas temperature does not vary from a constant predetermined safe level.

It has been found that the turbine discharge temperature can be controlled by varying the area of the jet nozzle. Increasing the area of the jet nozzle reduces the static pressure of the gas in the tail pipe thus reducing the back pressure on the turbine, which in turn produces a tendency for the turbine to overspeed with a resultant reduction in fuel flow to the combustion apparatus as a result of the action of the governor. Thus, the turbine discharge temperature is maintained at the proper level with a new thrust level, however, being produced by virtue of the reheat fuel burning in the tail pipe.

It is, therefore, desirable to increase or decrease the area of the jet nozzle proportional to an increase or decrease in the flow of reheat fuel to insure that the discharge temperature does not vary from a predetermined constant value during the tail pipe reheat fuel burning. One system for accomplishing this result forms a portion of the subject matter described and claimed in Patent No. 2,713,767, issued July 26, 1955, to Joseph S. Alford and Donald F. Warner and assigned to the same assignee as the present application. Since a single throttle control of the aircraft is advantageous, the main fuel regulator, reheat fuel regulator, and variable area jet nozzle may be arranged for actuation by a single throttle in accordance with a predetermined schedule to produce a predetermined relationship between throttle position and thrust. Thus, a jet nozzle area approximately appropriate to the reheat fuel flow is obtained for each throttle position. However, this throttle actuated reheat fuel flow and jet nozzle area scheduling may not be perfectly accomplished in a manner which will always under all flight conditions result in a turbine discharge temperature equal to the desired predetermined level. Therefore, it is also desirable to automatically modulate or trim the flow of reheat fuel in accordance with the turbine discharge temperature, overriding the flow called for by the throttle, to correct a variation from the predetermined temperature level. Thus, an increase in the turbine discharge temperature above the predetermined level would result in an automatic decrease in reheat fuel flow and conversely a decrease in turbine discharge temperature would result in an automatic increase in reheat fuel flow to maintain the temperature at the predetermined level.

An object of this invention is to provide an improved control system for a gas turbine power plant.

Another object of this invention is to provide an improved control system for an aircraft gas turbine power plant having exhaust reheating for augmentation of thrust whereby the turbine discharge temperature does not vary from a predetermined constant value.

A further object of this invention is to provide an improved control system for aircraft gas turbines having exhaust reheating for augmentation of thrust wherein the jet nozzle area and reheat fuel flow are scheduled and the reheat fuel flow is automatically trimmed in accordance with turbine discharge temperature so that said discharge temperature does not vary from a predetermined constant value.

A still further object of this invention is to provide an improved control system for aircraft gas turbines having exhaust reheating for augmentation of thrust wherein the jet nozzle area and reheat fuel flow are manually actuated and the reheat fuel flow is automatically trimmed so that the turbine discharge temperature does not vary from a predetermined constant value.

Further objects and advantages of this invention will become apparent and the invention will be better understood from the following description referring to the accompanying drawings, and the features of novelty which characterize the invention will be pointed out with particularity in the claims annexed to and forming part of this specification.

In accordance with this invention, an aircraft gas turbine having tail pipe reheat fuel burning for augmentation of thrust is provided with a variable area jet nozzle and a regulator for controlling the flow of reheat fuel. Means are provided, actuated by the throttle, for operating the variable area jet nozzle and reheat fuel regulator in accordance with a predetermined schedule to produce a predetermined relation between throttle position and thrust. Means such as thermocouples are positioned in the tail pipe intermediate the turbine and the point of introduction of reheat fuel for sensing the turbine discharge temperature. The signal from the thermocouples is compared with a reference temperature signal corresponding to a predetermined desired turbine discharge temperature and the resultant error signal is amplified to energize an actuator on the reheat fuel regulator so that the reheat fuel regulator is automatically trimmed, overriding the throttle actuated scheduling, to correct a variation from the predetermined desired turbine discharge temperature level. Thus, an increase in turbine discharge temperature produced by reheat fuel burning above the predetermined level produces a decrease in the flow of reheat fuel and conversely a decrease in turbine discharge temperature below the predetermined level produces an increase in reheat fuel flow to maintain the turbine discharge temperature at the predetermined desired level.

The single figure of the drawing is a schematic illustration of an aircraft gas turbine provided with the improved control system of this invention.

Referring now to the drawing, there is shown an aircraft gas turbine power plant, generally identified as 1.

Air is drawn in at inlet 2 and is compressed by compressor 3. The main fuel is introduced in combustion chambers 4 by suitable nozzles 5 which are connected in parallel flow relation to a common fuel manifold 6. The fuel is conveyed to the nozzles 5 by a suitable pump 7 from a fuel supply 8. The output of the pump 7 is modulated by a pump by-pass control 9 which in turn is controlled by a regulator and speed governor mechanism 10. The speed governor portion of the regulator 10 is driven from the gear case 11 of the turbine 1 by a mechanical drive shown schematically at 12. A shut off valve 13 is also arranged in the main fuel manifold 6.

In gas turbine power plants intended for use at sea level or at a substantially constant altitude, it is a relatively simple matter to supply the fuel requirements of the engine. However, in aircraft service where the engine is required to operate over a wide range of altitude and where the fuel requirements vary as a function of the altitude and other variables, it is desirable to provide compensation to limit the output of the fuel pump 7 in accordance with a preselected function of the atmospheric or some other pressure. Thus, the main fuel regulator 10 is provided with pressure compensation from any desired source as shown at 14.

After the input air has been compressed by the compressor 3 and heated in the combustion chambers 4, it is expanded through the turbine 15 which drives the compressor 3. The hot gases discharged from the turbine 15 are exhausted through the tail pipe 16 and provide the thrust for propelling the aircraft.

In order to provide for reheat augmentation of thrust, additional fuel is introduced into the tail pipe 16 through suitable nozzles 17 which are connected in parallel flow relation to a common fuel manifold 18. The reheat fuel is conveyed to the tail pipe nozzles 17 by a suitable pump 19 from the common fuel supply source 8, or alternatively from a separate supply source. The output of the fuel pump 19 is modulated by a reheat fuel regulator generally identified as 20 which is also provided with a suitable pressure bias as at 21. The reheat fuel regulator 20 is driven by a differential generally identified as 22 as will be hereinafter described. A shut off valve 23 is arranged in the reheat fuel manifold 18.

When the reheat fuel from the tail pipe nozzles 17 is burned in the tail pipe 16, the temperature of the gas in the tail pipe is increased accompanied by an increase in the static pressure of the gases in the tail pipe 16. This increase in static discharge gas pressure reduces the pressure drop across the turbine 15 tending to decrease its speed. The speed governor portion of the main fuel regulator 10 raises the main fuel flow through the nozzles 5 to return the speed to the value called for by the position of the throttle 24. The throttle 24 may be alternatively referred to below as a power lever. The increased fuel to air ratio in the combustion chambers 4 results in an increase in the temperature in the gas discharged from the turbine 15, which temperature may be destructive of the turbine blades and other elements of the turbine.

In order to reduce the excessive temperature of the gas discharged from the turbine 15 as a result of the burning of reheat fuel in the tail pipe 16, the tail pipe 16 is provided with a suitable variable area jet nozzle 25 which is actuated by a suitable nozzle actuator mechanism including a nozzle actuator motor 26, a selsyn transmitter 27, a selsyn receiver 28, and a nozzle position amplifier unit generally identified as 29, to be hereinafter more particularly described.

In order to provide for operation of the main fuel regulator 10, reheat fuel regulator 20, variable area jet nozzle 25, and the shut off valves 13 and 23, the arrangement now to be described is provided. The pilot's throttle 24 is used to manually control the operation of the plane and is connected through a shaft 30 to a scheduling unit generally identified as 31. The scheduling unit 31 includes a plurality of cams on shaft 32 which are utilized to actuate the above recited elements in accordance with a predetermined schedule to produce a predetermined relationship between throttle position and thrust. Thus, cam 33 is operatively connected to main fuel shut off valve 13, cam 34 is operatively connected to main fuel regulator 10, cam 35 operates selsyn transmitter 27 through gears 36 to actuate variable area jet nozzle 25 through selsyn receiver 28 and amplifier 29. Cam 37 is operatively connected to reheat fuel shut off valve 23 and cam 38 actuates the reheat fuel regulator 20 through input gear 43 and output gear 44 of differential 22. In operation, initial motion of the throttle 24 to the right causes clockwise rotation of shaft 32, causing cam 33 to immediately open main fuel shut off valve 13. Continued rightward motion of throttle 24 causes cam 34 to actuate main fuel regulator 10 to increase the main fuel flow at a predetermined rate. The cam 34 is provided with a dwell portion 39 after the maximum open position of main fuel regulator 10 has been reached. Cam 37 is provided with an initial dwell portion 40 corresponding to the increasing portion of cam 34 so that the reheat fuel shut off valve 23 remains closed during the period that the main fuel regulator 10 is being opened. When the maximum open position of the main fuel regulator 10 has been reached, the cam 37 rapidly opens the reheat fuel shut off valve 23. Cam 38 is also provided with a dwell portion 41 so that the reheat fuel regulator 20 is not actuated until the maximum open position of the main fuel regulator 10 has been reached. At that point, continued rightward motion of the throttle 24 causes cam 38 to actuate the reheat fuel regulator 20 at a predetermined rate. Cam 35 is provided with a dwell portion 42 during the period that the main fuel regulator 10 is being opened. After the main fuel regulator 10 has reached its maximum open position, at which time cam 38 actuates reheat fuel regulator 20 to introduce reheat fuel to the tail pipe 16, cam 35 drives selsyn transmitter 27 to cause opening of the variable area jet nozzle 25, the increasing portions of the cams 38 and 42 providing a predetermined relationship between the flow of reheat fuel compensated by pressure bias 21 and the position of the variable area jet nozzle 25. It may be desirable to begin opening of the variable area jet nozzle 25 prior to the maximum open position of the main fuel regulator 10 and it is readily apparent that the configuration of the cam 35 can be suitably arranged to provide this operation.

It can now be seen that the manual actuation of the reheat fuel regulator 20 and variable area jet nozzle 25 by throttle 24 is scheduled by the schedule unit 31 so that a jet nozzle area approximately appropriate to the reheat fuel flow is obtained for each throttle position. However, this reheat fuel to jet nozzle area scheduling cannot be accomplished perfectly in a manner which will always under all flight conditions result in a turbine discharge temperature equal to the desired temperature level. In order to correct for a variation of the discharge temperature from the desired level, one or more low time constant temperature sensing units, such as thermocouples 45 are positioned in the tail pipe 16 intermediate the turbine 15 and the tail pipe burning nozzles 17. The thermocouples 45 measure substantially the average temperature of the gas discharged from the turbine prior to the introduction of the reheat fuel. The signal from the thermocouples 45 is received by a temperature control unit generally identified as 46 which energizes a reheat fuel regulator drive motor 47 responsive to the discharge temperature of the turbine 15 so that the reheat fuel regulator 20 is modulated or trimmed to override the manual scheduled actuation by the throttle 24 and automatically correct the variation in the turbine discharge temperature.

In the event that the temperature sensing elements are thermocouples, it may be found desirable to compare the temperature signal from the thermocouples with a reference temperature signal corresponding to the desired predetermined turbine discharge temperature, to amplify the error signal, and to use the amplified error signal to energize the reheat fuel regulator drive motor 47. In such a system, the thermocouples 45 are arranged in series with a constant reference voltage source which may comprise potentiometer 48 and a battery 49. Thus, the direct current voltage signal from the thermocouples 45 is compared with the voltage of the reference voltage source and the result of this comparison, a plus or a minus or a zero error signal is converted to direct current pulses by converter 50. Converter 50 may be a simple vibrator unit operated from a source of alternating current connected at terminals 51 so that a plus direct current voltage error signal is changed to a series of plus voltage pulses of the same frequency as the frequency of the alternating current source connected at 51 while a minus error signal will be changed to a corresponding series of minus pulses displaced in phase by 180° from the plus pulses. The plus or minus pulses are impressed on the grid of a voltage amplifier 52 and the amplified error signal which is of one phase for the plus error signal and phase displaced by 180° for a minus error signal is impressed on both grids of a dual tube 53. The plates of the tube 53 are respectively arranged in series with the secondaries of transformers 54 and 55, the primaries being energized from the source of alternating current connected at 51. Also respectively arranged in series with the plates of the tube 53 and the secondaries of the transformers 54 and 55 are relay coils 56 and 57. The tube 53 and the transformers 54 and 55 comprise a phase discriminator circuit in which the amplified plus or minus error signal is compared with the alternating current source connected at 51. The resultant phase signal will energize either relay coil 56 responsive to a plus error signal or relay coil 57 responsive to a minus error signal.

Contacts 58 and normally closed limit switch contacts 59 actuated by cam 60 are arranged in series with field winding 61 of reheat fuel regulator drive motor 47 and a source of actuator motor power connected at terminal 62. The reheat fuel regulator drive motor 47 is also provided with a series clutch-brake coil 63. The reheat regulator drive motor 47 is linked as by gears 64 and shaft 65 to the cage 66 of the differential 22. Thus, when the reheat regulator drive motor 47 is not operated to drive the cage 66, movement of the throttle 24 is transmitted through the cam 38, and input and output gears 43 and 44 of the differential 22 directly to operate the reheat regulator 20. Cam 60 is actuated by shaft 65 to open contacts 59 to stop the reheat regulator drive motor 47 at a predetermined minimum fuel flow.

With a system as thus far described, during full "dry" or unaugmented operation, the steady state turbine discharge temperature is at or lower than the reference temperature and the variable area jet nozzle 25 is maintained at its fully closed position by the schedule unit 31. The first few degrees of advance of the throttle 24 beyond the point of full dry operation opens a valve to a pilot burner (not shown) and switches on the pilot burner ignition (also not shown) for the reheat nozzles 17. As the throttle advance is continued, the cam 37 opens the reheat shut off valve 23, the cam 38 begins to increase the flow of reheat fuel, and the cam 35 begins to open the variable area jet nozzle 25 to maintain the turbine discharge temperature slightly higher than the reference level. Any slight increase in the turbine discharge temperature above the reference level established by the constant voltage source 48 and 49 is sensed by the thermocouples 45 and results in a plus error signal which energizes relay coil 56 closing contacts 58. Since the reheat regulator drive motor 47 has not operated to reduce the reheat fuel flow to a minimum flow, the contacts 59 of limit switch 60 will be closed and, therefore, field winding 61 of the reheat regulator drive motor 47 will be energized. Thus, the reheat regulator drive motor 47 will be operated to drive the cage 66 of the differential 22 in the proper direction to override or wipe out the advance of the throttle 24 so that the reheat fuel regulator 20 is automatically trimmed to reduce the reheat fuel flow to maintain the turbine discharge temperature at the reference level. When the reheat regulator drive motor 47 has driven the reheat regulator 20 a sufficient amount to reduce the reheat fuel flow to a point where the turbine discharge temperature has been returned to the desired value, a zero error signal will be impressed on the converter 50 causing the relay coil 56 to be deenergized opening the contacts 58 to stop the reheat regulator drive motor 47. When the clutch-brake coil 63 is deenergized, a brake mechanism (not shown) immediately stops the motor 47.

Any movement of the reheat regulator drive motor 47 to override the position of the throttle 24 responsive to a plus error signal on the relay coil 56 causes cam 60 on the shaft 65 to close the limit switch contact 67 in the circuit of the field exciting winding 68 of the reheat regulator drive motor 47. This permits subsequent operation of the drive motor 47 to increase the reheat fuel flow in the event a minus error signal should be developed. In the event that continued advance of the throttle 24 is not accompanied by sufficient scheduled opening of the variable area jet nozzle 25, as for instance when the variable area jet nozzle 25 has reached its maximum open position, the reheat regulator drive motor 47 will continue to drive the cage 66 of the differential 22 to override the increased reheat fuel flow called for by the throttle 24 to maintain the turbine discharge temperature constant. This operation continues until cam 60 opens the contacts 59 to stop the motor 47 at a predetermined minimum fuel flow.

It is possible that under various conditions, the turbine discharge temperature during augmentation may fall below the reference level and it is, therefore, desirable to increase the temperature to the reference level to produce the maximum permissible thrust. A minus error signal from the thermocouples 45 energizes relay coil 57 closing contacts 69 to energize field exciting winding 68 of the reheat fuel regulator drive motor 47 through contacts 67. The reheat regulator drive motor 47 then operates to drive the cage 66 of the differential 22 in the opposite direction to maintain the reheat fuel flow at the proper value to keep the turbine discharge temperature at the reference level. In this case also, when the temperature of the turbine discharge gas equals the reference temperature, a zero error signal will result which deenergizes the relay coil 57 opening contacts 69 and stopping the reheat fuel regulator drive motor 47.

It will be readily apparent that the action of the temperature control amplifier unit 46 to energize the reheat fuel drive motor 47 and override the reheat fuel flow called for by the throttle 24 occurs substantially simultaneously with the tendency of the turbine discharge gas to increase or decrease. Thus, a tendency for the turbine discharge gas to vary from the reference level is substantially simultaneously accompanied by an automatic trimming of the reheat fuel regulator 20 so that the temperature variation is wiped out to maintain the turbine discharge temperature at substantially a constant level.

In the temperature control amplifier unit 46, it is desirable to provide a stabilizing network between the contacts 58 and 69 and the phase discriminator to match the action of the temperature control amplifier unit 46 to the time constants of the gas turbine 1. The stabilizing network may include auxiliary contacts 70 and 71 respectively, actuated by the relay coils 56 and 57, and a series resistor 73 connected between the resistor 74 and a capacitor 75, and a source of amplifier power (not shown) connected at terminal 76. Thus, when the relay coil 56 is energized responsive to a plus error signal, contacts 70 are closed in addition to contacts 58 placing a predetermined voltage across the capacitor 75 determined by the setting of the potentiometer 72.

The values of the capacitor 75 and resistors 72 and 73 are proportioned so that the time constant of this RC circuit approximates the combined time constants of the engine and control system including; the gas turbine, the governor and main fuel system, the thermocouples, and the rate of tail pipe pressure change which is produced by the outputs of the control system, i. e. nozzle area and reheat fuel flow; which time constants are dependent upon the prevailing flight conditions including altitude, air speed, etc. The potentiometer 72 is set so that the feedback voltage taken therefrom is of the proper value to obtain the correct drop out time to equal the time constants enumerated above. It may be desirable to adjust the stabilizing signal to the flight conditions and to secure this result, the potentiometer 72 may be connected to a device responsive to an appropriate pressure such as a compressor inlet pressure or compressor discharge pressure. Thus, a voltage is impressed on the grids of the tube 53 which tends to oppose the error signal. A similar action, of course, takes place when contacts 71 are closed by the action of the relay coil 57 responsive to a minus error signal.

The amplifier 46, described above, is shown and described in a more elaborate form in a copending application Serial No. 102,226, filed June 30, 1949, by Edwin J. Jackson and Alan J. Gardiner, now Patent No. 2,699,524, issued January 11, 1955, and assigned to the same assignee as the present application. The stabilization circuit of this amplifier, including the potentiometer 72 and the capacitor 75, forms a portion of the subject matter of the Jackson and Gardiner application.

In the embodiment disclosed, the selsyn transmitter 27, which is driven responsive to movement of the throttle 24 by cam 35 and gears 36, is energized from the external source of alternating current power (not shown) connected through lines 77. The selsyn transmitter 27 is connected to the selsyn receiver 28 by lines 78 and the receiver is arranged on the same shaft 79 as the jet nozzle actuator motor 26. The coil 80 of the selsyn receiver 28 is connected to the primary of transformer 81 of jet nozzle position amplifier 29, the secondary being connected to the grids of a suitable dual tube 82. The plates of the tube 82 are respectively arranged in series with the secondaries of transformers 83 and 84, the primaries being arranged in parallel for energization from the alternating current source connected at 77. Also respectively arranged in series with the secondaries of transformers 83 and 84 and the plates of the tube 82 are relay coils 85 and 86 which actuate contacts 87 and 88. The contacts 87 and 88 are respectively arranged in series with the field exciting windings 89 and 90 of the jet nozzle actuator motor 26, the motor also being provided with a clutchbrake coil 91. The series field exciting windings 89 and 90 of the jet nozzle actuator motor 26 are excited by the source of actuator motor power 62. Assuming that the variable area jet nozzle 25 is in the position called for by the throttle 24, there would be no output from the coil 80 of the selsyn receiver 28 and, therefore, no voltage signal will appear across the transformer 81 of the jet nozzle position amplifier 29. However, any movement of the throttle 24 which results in rotation of the selsyn transmitter 27 produces an error signal voltage on the transformer 81 which is impressed on the grids of the tube 82, depending upon the phase of the error signal which in turn depends upon whether the variable area jet nozzle 25 is in a position more open or more closed than that called for by the throttle 24, either the relay coil 85 or the relay coil 86 will be energized to either close the contact 87 or the contact 88. This in turn will energize either the series field exciting winding 89 or 90 to energize the jet nozzle actuator motor 26 to drive the variable area jet nozzle 25 in the proper direction. It will be readily understood that while a selsyn system has been shown for actuating the variable area jet nozzle 25, any other suitable servo system may be utilized.

The reheat fuel regulator 20 may include a pump bypass valve 92 actuated by cam 93 which is in turn driven by the differential 22. The cam 93 is provided with a dwell portion 94 for the purpose now to be described. When the throttle 24 is advanced into the reheat region, the cam 38 drives the differential 22 to the left so that the flow of reheat fuel is increased. At this point, either the reheat regulator actuator motor 47 or the throttle 24 can reduce the flow of reheat fuel, however, it is apparent that both the throttle 24 and the temperature control amplifier 46 must call for reheat fuel to permit maximum reheat fuel flow. If the variable area jet nozzle 25 has been driven to its maximum open position and the temperature control transferred, as heretofore described, to the reheat regulator actuator motor 47, continued excessive temperature will cause the reheat regulator actuator motor 47 to drive the differential 22 to move the cam 93 clockwise to decrease the flow of reheat fuel. At this point, if the throttle 24 is rapidly retarded, the cam 38 will also drive the differential 22 to move the cam 93 counter-clockwise. To provide for the eventuality that both the throttle 24 and the temperature amplifier 46 call for reduced reheat fuel flow, the dwell portion 94 on the cam 93 is provided to furnish over travel to prevent damage to the system.

While thermocouples are disclosed as the temperature sensing elements, it will be readily understood that any other temperature sensing device can be utilized such as a bi-metallic strip or a spectrum analyzing unit. It may also be found desirable to utilize temperatures other than the turbine discharge temperature to trim the reheat fuel regulator, for instance turbine inlet temperature or the temperature of the metal of the turbine blades or the tail pipe. While the thermocouples are disclosed as being positioned in the tail pipe intermediate the turbine and the point of reheat fuel, the temperature sensing element for sensing turbine discharge temperature may be located elsewhere, for instance on the turbine blades.

It will now be readily apparent that the control system described herein provides manually actuated scheduled control of the jet nozzle area and reheat fuel and in addition insures that the turbine discharge temperature does not vary from a predetermined constant value during augmentation by trimming the reheat fuel regulator in accordance with the turbine discharge temperature.

While we have illustrated and described a particular embodiment of this invention, modifications thereof will occur to those skilled in the art. We desire it to be understood, therefore, that this invention is not to be limited to the particular arrangement disclosed, and we intend in the appended claims to cover all modifications which do not depart from the spirit and scope of the invention.

What we claim as new and desire to secure by Letters Patent of the United States is:

1. In an aircraft gas turbine power plant having tail pipe reheat fuel burning for augmentation of thrust, means for varying the area of the jet nozzle of said power plant, means for regulating the flow of reheat fuel, manually actuated means for operating said jet nozzle area varying means and said reheat fuel regulating means, and means responsive to said turbine discharge temperature connected to said reheat regulating means for overriding said manual operation thereof independent of said nozzle area varying means to automatically trim said reheat fuel regulating means whereby the flow of said reheat fuel is controlled so that a variation from a predetermined desired temperature is corrected.

2. In an aircraft gas turbine power plant having tail pipe reheat fuel burning for augmentation of thrust, means for varying the area of the jet nozzle of said power plant to prevent excessive turbine discharge temperature, means for regulating the flow of reheat fuel, manually actuated means for operating said jet nozzle area varying means and said reheat fuel regulating means in accordance with a predetermined schedule, and means responsive to said turbine discharge temperature connected to said reheat regulating means for overriding said manual operation thereof independent of said nozzle area varying means to automatically trim said reheat fuel regulating means whereby the flow of said reheat fuel is controlled so that a variation from a predetermined desired temperature is corrected.

3. In an aircraft gas turbine power plant having tail pipe reheat fuel burning for augmentation of thrust, means for varying the area of the jet nozzle of said power plant, means for regulating the flow of reheat fuel, means for regulating the flow of main fuel, manually actuated means for operating said jet nozzle area varying means and said reheat fuel regulator means and said main fuel regulator means, and means responsive to said turbine discharge temperature connected to said reheat fuel regulating means for overriding said manual operation thereof independent of said nozzle area varying means to automatically trim said reheat fuel regulating means whereby the flow of said reheat fuel is controlled so that a variation from a predetermined desired temperature is corrected.

4. In an aircraft gas turbine power plant having tail pipe reheat fuel burning for augmentation of thrust, means for varying the area of the jet nozzle of said power plant to prevent excessive turbine discharge temperature, means for regulating the flow of reheat fuel, means for regulating the flow of main fuel, manually actuated means for operating said jet nozzle area varying means and said reheat fuel regulating means and said main fuel regulating means oin accordance with a predetermined schedule, and means responsive to said turbine discharge temperature connected to said reheat fuel regulating means for overriding said manual operation thereof independent of said nozzle area varying means to automatically trim said reheat fuel regulating means whereby the flow of said reheat fuel is controlled so that a variation from a predetermined desired temperature is corrected.

5. In an aircraft gas turbine power plant having tail pipe reheat fuel burning for augmentation of thrust, means for varying the area of the jet nozzle of said power plant to prevent excessive turbine discharge temperature, means for regulating the flow of reheat fuel, means for regulating the flow of main fuel, manual throttle means for controlling the operation of said power plant, means actuated by said throttle for operating said jet nozzle area varying means and said reheat regulating means and said main fuel regulating means in accordance with a predetermined schedule, and means responsive to said turbine discharge temperature connected to said reheat fuel regulator for overriding said throttle actuated operation thereof to automatically trim said reheat fuel regulating means whereby the flow of said reheat fuel is controlled so that a variation from a predetermined temperature is corrected.

6. In an aircraft gas turbine power plant having tail pipe reheat fuel burning for augmentation of thrust, means for varying the area of the jet nozzle of said power plant, means for regulating the flow of reheat fuel, means for regulating the flow of main fuel, manual throttle means for controlling the operation of said power plant, means actuated by said throttle and operatively connected to said jet nozzle area varying means and said reheat fuel regulating means and said main fuel regulating means for operating the same in accordance with a predetermined schedule to produce a predetermined relationship between the position of said throttle and the thrust produced by said power plant, and means responsive to said turbine discharge temperature connected to said reheat regulator for overriding said throttle actuated operation thereof to automatically trim said reheat fuel regulating means whereby the flow of said reheat fuel is controlled so that a variation from a predetermined temperature is corrected.

7. In an aircraft gas turbine power plant having tail pipe reheat fuel burning for augmentation of thrust, means for varying the area of the jet nozzle of said power plant, means for regulating the flow of reheat fuel, manually actuated means for operating said jet nozzle area varying means and said reheat fuel regulating means in accordance with a predetermined schedule, means including a thermocouple for sensing the discharge temperature of said turbine, and means operable in response to the signal from said thermocouple and operatively connected to said reheat fuel regulating means for overriding said manual operation of said reheat fuel regulating means to trim said reheat fuel regulating means whereby the flow of said reheat fuel is increased or decreased proportional to a decrease or increase in said turbine discharge temperature to correct a variation from a predetermined desired temperature.

8. In an aircraft gas turbine power plant having tail pipe reheat fuel burning for augmentation of thrust, means for varying the area of the jet nozzle of said power plant to maintain a predetermined turbine discharge temperature, means for regulating the flow of reheat fuel, manually actuated means for operating said jet nozzle area varying means and said reheat regulating means in accordance with a predetermined schedule, means including a thermocouple for sensing the discharge temperature of said turbine, means for comparing a reference temperature signal with the signal from said thermocouples to produce an error signal, and means operable in response to said error signal and operatively connected to said reheat fuel regulating means for overriding said manual operation of said reheat fuel regulating means to automatically trim said reheat fuel regulating means whereby the flow of said reheat fuel is increased or decreased proportional to a decrease or increase in said turbine discharge temperature to correct a variation from said predetermined temperature.

9. In an aircraft gas turbine power plant having tail pipe reheat fuel burning for augmentation of thrust, means for varying the area of the jet nozzle of said power plant to maintain a predetermined discharge temperature, means for regulating the flow of reheat fuel, means for regulating the flow of main fuel, manually actuated throttle means for controlling the operation of said power plant, means actuated by said throttle and operatively connected to said jet nozzle area varying means and said reheat fuel regulating means and said main fuel regulating means for operating the same in accordance with a predetermined schedule to produce a predetermined relationship between the position of said throttle and the thrust produced by said power plant, means including a thermocouple positioned intermediate said turbine and the point of introduction of said reheat fuel for sensing the discharge temperature of said turbine, means for comparing a reference temperature signal with the signal from said thermocouple to produce an error signal, and means operable in response to said error signal and operatively connected to said reheat fuel regulating means for overriding said manual operation of said reheat fuel regulating means to automatically trim said reheat fuel regulating means whereby the flow of said reheat fuel is increased or decreased proportional to a decrease or increase of said turbine discharge temperature to correct a variation from said predetermined temperature.

10. In an aircraft gas turbine power plant having tail pipe re-heat fuel burning for augmentation of thrust, means for supplying re-heat fuel at a variable rate of flow, variable nozzle means for varying the discharge flow area of said power plant, control means connected to said fuel supply means and said variable nozzle means for increasing the rate of fuel flow and the discharge flow area according to predetermined schedules upon an increase in power output demand, and temperature control means responsive to a temperature of said power plant connected to said fuel supply means for lowering the schedule of re-heat fuel input with respect to the schedule of nozzle area to maintain a predetermined maximum power plant temperature at power levels at which said schedules would othrewise call for temperature in excess of said predetermined maximum temperature.

11. In an aircraft gas turbine power plant having tail pipe re-heat fuel burning for augmentation of thrust, means for supplying re-heat fuel at a variable rate of flow, variable nozzle means for varying the discharge flow area of said power plant, control means connected to said fuel supply means and said variable nozzle means for governing the rate of fuel flow and the discharge flow area according to predetermined schedules dependent upon power output demand, said governing means including a power lever settable to different power demand positions, and temperature control means responsive to a temperature of said power plant connected to said governing means for lowering the schedule of re-heat fuel input with respect to the schedule of nozzle area to maintain a predetermined maximum power plant temperature at power levels at which said schedules would otherwise call for temperatures in excess of said predetermined maximum temperature.

12. In a gas turbine power plant of the reaction type having means for supplying re-heat fuel downstream from the turbine, variable nozzle means for varying the discharge flow area of said power plant, means for supplying main fuel to said power plant upstream from the turbine, control means connected to said nozzle area varying means and said main fuel supply means for varying the area of said nozzle and for varying the supply of main fuel according to a predetermined schedule dependent upon required power output, a connection from said control means to said reheat fuel supply means for initiating re-heat fuel flow in a predetermined sequence with respect to the schedules of main fuel flow and nozzle opening and means responsive to a temperature of said power plant connected to said reheat fuel supply means to modulate the flow of re-heat fuel to maintain a predetermined desired power plant temperature.

13. In a gas turbine power plant of the reaction type having means for supplying re-heat fuel downstream from the turbine, variable nozzle means for varying the discharge flow area of said power plant, means for supplying main fuel to said power plant upstream from the turbine, a power lever for setting a desired power output, control means for connecting said power lever to said nozzle area varying means and said main fuel supply means for varying the area of said nozzle and for varying the supply of main fuel according to a predetermined schedule dependent upon required power output, a connection from said control means to said re-heat fuel supply means for initiating re-heat fuel flow in a predetermined sequence with respect to the schedule of main fuel flow and nozzle opening and means responsive to a temperature of said power plant connected to said reheat fuel supply means to modulate the flow of re-heat fuel to maintain a predetermined desired power plant temperature.

14. A gas turbine power plant employing re-heat fuel burning for augmentation of thrust and comprising a device for varying the discharge nozzle area of said power plant, a main fuel supply system and a re-heat fuel supply system each having a fuel shut-off valve, a fuel pump, a fuel by-pass valve connected to by-pass said fuel pump to control the rate of fuel delivery, and a fuel regulator responsive to the temperature of the power plant connected to control the operation of said by-pass valve, a control mechanism having a thrust selecting power lever, connections from said control mechanism to said fuel shut-off valves, said fuel regulators, and said nozzle area varying device for actuation thereof in response to thrust increasing movement of said power lever in accordance with a predetermined schedule to obtain sequential opening of said main and re-heat fuel shut-off valves, sequential initiation of increase of main and re-heat fuel flows and operation of said nozzle area varying device to enlarge the nozzle in the high thrust range of movement of said power lever.

15. A gas turbine power plant employing re-heat fuel burning for augmentation of thrust and comprising a device for varying the discharge nozzle area of said power plant, a main fuel supply system and a re-heat fuel supply system each having a fuel shut-off valve, a fuel pump, a fuel by-pass valve connected to by-pass said fuel pump to control the rate of fuel delivery, and a fuel regulator responsive to the temperature of the power plant connected to control the operation of said by-pass valve, a control mechanism having a thrust selecting power lever, connections from said control mechanism to said fuel shut-off valves, said fuel regulators, and said nozzle area varying device for actuation thereof in response to thrust increasing movement of said power lever in accordance with a predetermined schedule to obtain sequential opening of said main and re-eat fuel shut-off valves sequential initiation of increase of main and re-heat fuel flows and operation of said nozzle area varying device to enlarge the nozzle in the high thrust range of movement of said power lever, a device for sensing a temperature of said power plant, a connection from said temperature sensing device to said re-heat fuel regulator for modifying the flow of re-heat fuel to maintain a predetermined desired maximum temperature as determined by said temperature sensing device.

References Cited in the file of this patent

UNITED STATES PATENTS

| | | |
|---|---|---|
| 2,095,991 | Lysholm | Oct. 19, 1937 |
| 2,478,909 | Flagle | Aug. 16, 1949 |
| 2,498,939 | Bobier | Feb. 28, 1950 |
| 2,514,248 | Lombard et al. | July 4, 1950 |
| 2,520,434 | Robson | Aug. 29, 1950 |
| 2,674,843 | Lombard | Apr. 13, 1954 |